US006133646A

United States Patent [19]

Segawa et al.

[11] Patent Number: 6,133,646

[45] Date of Patent: Oct. 17, 2000

[54] DOOR-LOCK DEVICE FOR VEHICLE

[75] Inventors: Kunio Segawa; Toshifumi Ikeda, both of Hiroshima, Japan

[73] Assignee: Mazda Motor Corporation, Hiroshima, Japan

[21] Appl. No.: 09/215,349

[22] Filed: Dec. 18, 1998

[30] Foreign Application Priority Data

Dec. 19, 1997 [JP] Japan .................................... 9-351724

[51] Int. Cl.$^{7}$ ........................................................ B60L 1/00

[52] U.S. Cl. .......................... 307/10.1; 307/9.1; 307/10.2

[58] Field of Search ................................. 307/10.1, 10.2, 307/9.1; 340/426; 70/277

[56] References Cited

U.S. PATENT DOCUMENTS 4,519,227 5/1985 Dumbser et al. .

4,537,049 8/1985 Lupoli ........................................ 70/277

4,730,120 3/1988 Okada ........................................ 307/10

5,965,953 10/1999 Ikeda et al. ............................ 307/10.2

FOREIGN PATENT DOCUMENTS 58-176374 10/1983 Japan .

*Primary Examiner*—Stephen W. Jackson

*Assistant Examiner*—Sharon Polk

[57] ABSTRACT

When a control unit for controlling a 2-motor-3-relay type locking system makes a transition to, for example, an N/L (lock) state, the two motors are turned on or off such that operation timings of the motors are shifted from each other by a period of time longer than a shift amount (variation) of required operation times of the relays.

12 Claims, 6 Drawing Sheets

DOOR-LOCK DEVICE FOR VEHICLE

BACKGROUND OF THE INVENTION

1. Field of the Invention

The present invention relates to a door-lock control device for vehicle, e.g., a door-lock control device for an automobile serving as a typical vehicle.

2. Description of the Related Art

Conventionally, in an automobile serving as a typical vehicle, there is provided a locking system having a so-called lock-keep system in which a locked state is set when a door of the automobile is closed, and the locked state is kept.

As an example of such a locking system, Japanese Patent Publication Laid-open No. 58-176374 proposes a so-called 2-motor-3-relay-type locking system. In the system of this type, a transition to the states, i.e., a locked state, an unlocked state, and a lock-keep state is realized by a control unit constituted by two motors and three relays.

However, in the prior art described above, the control unit turns two of the three relays on/off at the same timing. If the timings of the two relays are shifted from each other for some reason, a transition to a state different from a state desired by an operator (i.e., state selected by the operator) may be made. In particular, an unexpected transition to the lock-keep state has a problem in safety.

SUMMARY OF THE INVENTION

It is an object of the present invention to provide a door-lock control device for vehicle which can reliably performs an unlock operation, a lock operation, and a lock-keep operation.

In order to achieve the above object, a door-lock control device for vehicle according to the present invention has the following arrangement as a characteristic feature.

More specifically, a door-lock control device for vehicle, for controlling a 2-motor-3-relay type locking system, in which in order to cause the locking system arranged in a vehicle to perform an unlock operation, a lock operation, and a lock-keep operation, an output voltage is turned on/off, through three relays connected in correspondence with these operations, by operating two of the three relays to operate two motors commonly connected to the relay for the unlock operation, characterized by comprising control means for shifting timings at which two of the three relays are turned on or off from each other by a predetermined period of time.

In this manner, the lock operation, the unlock operation, and the lock-keep operation are reliably performed.

Preferably, in the control means, when the locking system is caused to perform a lock operation, the relay for the unlock operation may be turned on a first predetermined period of time after the relay for the lock-keep operation is turned on, and the relay for the lock-keep operation may be turned off a second predetermined period of time after the relay for the unlock operation is turned off.

Preferably, in the control means, when the locking system is caused to perform a lock-keep operation, the relay for the lock operation may be turned on the first predetermined period of time after the relay for the unlock operation is turned on, and the relay for the unlock operation may be turned off the second predetermined period of time after the relay for the lock operation is turned off.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

DESCRIPTION OF THE PREFERRED EMBODIMENT

An embodiment of a door-lock control device according to the present invention will be described below with reference to the accompanying drawings.

In the following description, lock releasing is called unlocking (U/L), locking is called normal locking (N/L), and lock-keeping is called super locking (S/L), hereinafter. In this embodiment, as a mechanical system for realizing an S/L operation, a general system in which a state transition to a U/L state, an N/L state, and an S/L state can be made in this order, and a detailed description thereof will be omitted.

[Arrangement of Hardware]

Figure 1:
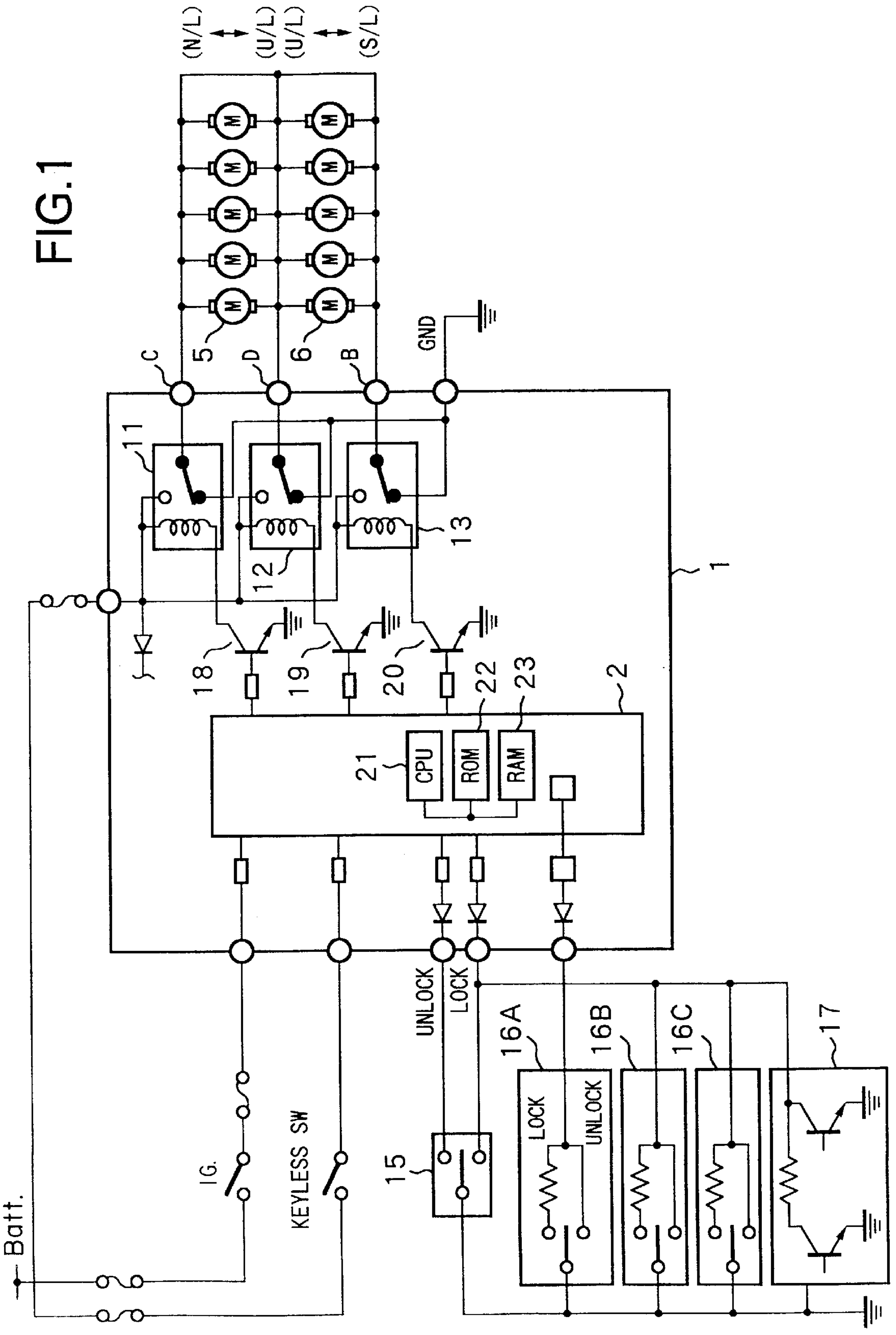
FIG. 1 is a block diagram of a door-lock control device for vehicle according to an embodiment of the present invention.

FIG. 1 is a block diagram of a door-lock control device for vehicle according to an embodiment of the present invention. The door-lock control device has a 2-motor-3-relay type locking system.

In FIG. 1, a control unit 1 comprises a microcomputer 2, transistor switches 18, 19, and 20, an N/L relay 11, a U/L relay 12, and an S/L relay 13. The contact points of the three relays are in contact with a ground (GND) in a non-energizing state, as shown in FIG. 1.

The N/L relay 11 outputs a voltage supplied from a battery (Batt.) to an output terminal C of the control unit 1 depending on an output signal (status signal) of the microcomputer 2 and a switching state of the transistor switch 18 which is turned on/off by the output signal. Similarly, the U/L relay 12 outputs the voltage to an output terminal D, and the S/L relay 13 outputs the voltage to the output terminal B.

Two DC motors connected to the output terminals B, C, and D of the control unit 1 by using the terminal D as a common terminal are an N/L motor 5 and an S/L motor 6 which make a transition from the U/L state to the N/L state and the S/L state, respectively. A locking system (not shown) is operated by the two motors. In this embodiment, for example, for the four front-right, front-left, rear-right, and rear-left doors and a lift gate of an automobile, as shown in FIG. 1, five pairs of N/L motors 5 and S/L motors 6 are connected.

Here, the basic operations of the N/L motor 5 and the S/L motor 6 will be described below. For example, the present state is an N/L state. When a transition from the N/L state to a U/L state is to be made, the N/L relay 11 is driven, and a current is caused to flow from the terminal C to the terminal D through the N/L motor 5, thereby operating the N/L motor 5. When a transition from the U/L state to the N/L state is made, the U/L relay 12 is driven to backwardly rotate the N/L motor 5. Similarly, between the U/L state and an S/L state, the S/L motor 6 may be forwardly/backwardly rotated by the U/L relay 12 or the S/L relay 13 (detailed operation will be described below).

To the control unit 1, a lock/unlock state signal from the lock link switch 15, arranged near the driver's seat, for performing both lock/unlock operations of the vehicle is input.

To the control unit 1, lock/unlock state signals from a driver's seat key cylinder switch 16A arranged in the key cylinder of a driver's seat door, a passenger seat key cylinder switch 16B arranged in the key cylinder of a passenger seat door, and a lift gate key cylinder switch 16C arranged in the key cylinder of the lift gate at the back end of the vehicle are input.

To which the control unit 1, a lock/unlock state signal detected by a keyless entry unit 17 for locking/unlocking the vehicle according to a radio wave from a keyless entry terminal (not shown) is input.

The microcomputer 2 comprises a CPU 21, a ROM 22, and a RAM 23. The CPU 21 controls the door-lock control device according to a lock control program or the like (to be described later) pre-stored in the ROM 22 while the RAM 23 is used as a temporary storage area and a work area for various data.

A lock control process which is executed by the microcomputer 2 of the control unit 1 according to the program pre-stored in the ROM 22 will be described below. This control process is started when a driver turns an ignition key switch (IG) on, and executed by the microcomputer 2.

[Lock Control Process]

A lock control process performed by the door-lock control device in this embodiment will be described below. In this embodiment, the transition to the S/L state is made when the driver operates the ignition key switch (IG) twice within a predetermined period of time or when two continuous radio waves received from a keyless entry terminal within a predetermined period of time are equal to a request signal in the N/L state.

Figure 2:
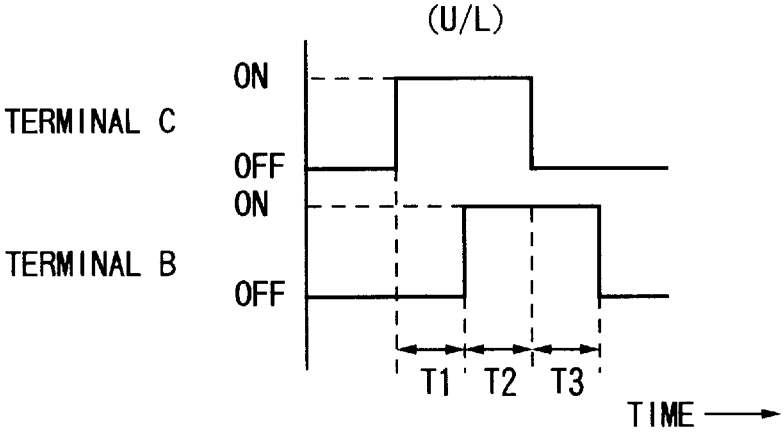
FIG. 2 is a graph showing an output signal for making a transition to a U/L state by the door-lock control device according to the embodiment of the present invention.

FIG. 2 is a graph showing an output signal for causing the door-lock control device according to the embodiment of the present invention to make a transition to the U/L state.

In order to make a transition from the state of the locking system to the U/L state, as shown in FIG. 2, the output voltage of the terminal C is turned on to drive the N/L motor 5 in a U/L direction. The output voltage of the terminal B is turned on a predetermined period of time T1 after the output voltage of the terminal C is turned on to drive the S/L motor 6 in a U/L direction. The output voltage of the terminal C is turned off a predetermined period of time T2 after the output voltage of the terminal B is turned on, and the output voltage of the terminal B is turned off a predetermined period of time T3 after the timing at which the output voltage of the terminal C is turned off. With the series of operations, the locking system is subjected to the transition to the U/L state.

Here, the reason why the output timing of the terminal C is delayed from the output timing of the terminal B by the predetermined period of time T1 will be described below. In general, times required for mechanical operations of contact points formed in relays have an individual difference. Even if the N/L relay 11 and the S/L relay 13 are relays having the same specification, the required operation times of these relays have an individual difference (allowable error) of about 0.01 †sec. Therefore, when the locking system is subjected to the transition to the U/L state, it is assumed that output timings from the microcomputer 2 to the terminal C and the terminal D are set to be equal to each other. In this case, when voltages are actually output, the output timing of the terminal B may be delayed from the output timing of the terminal C because of the individual difference of the required operation times. In this case, the S/L motor 6 is operated in the S/L direction by the output voltage from the terminal C until the output voltage from the terminal B is applied. This phenomenon is not preferable in safety.

Therefore, according to this embodiment, the output timing of the terminal B is delayed from the output timing of the terminal C by the predetermined period of time T1, and the predetermined period of time T1 is set to be a time (e.g., 0.2 †sec) which is longer than a nominal error (allowable error) between the required operation times of the N/L relay 11 and the S/L relay 13, so that the S/L motor 6 can be reliably prevented from being operated in the S/L direction.

Of the timings at which the output voltages of the terminal C and the terminal B are turned off, the output timing of the terminal B is delayed because of the limitation of a locking system (not shown).

Figure 3:
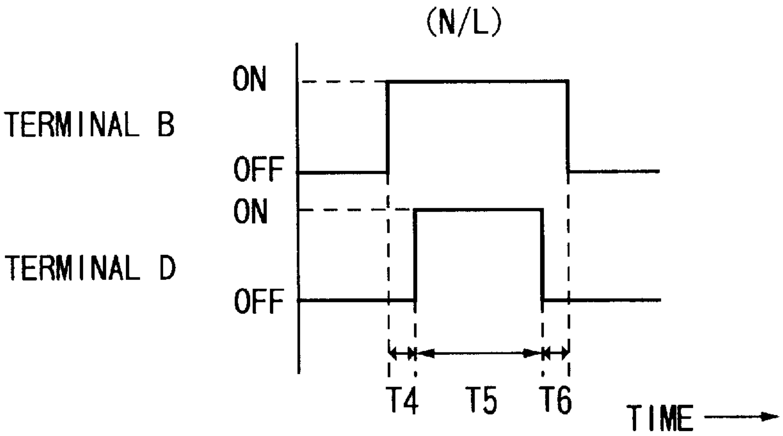
FIG. 3 is a graph showing an output signal for making a transition to an N/L state by the door-lock control device according to the embodiment of the present invention.

FIG. 3 is a graph showing an output signal for causing the door-lock control device according to the embodiment of the present invention to make a transition to the N/L state.

In order to make a transition from the state of the locking system to the N/L state, as shown in FIG. 3, the output voltage of the terminal B is turned on to drive the S/L motor 6 in a U/L direction. The output voltage of the terminal D is turned on a predetermined period of time T4 after the output voltage of the terminal B is turned on to drive the N/L motor 5 in an N/L direction. The output voltage of the terminal D is turned off a predetermined period of time T5 after the output voltage of the terminal D is turned on, and the output voltage of the terminal B is turned off a predetermined period of time T6 after the timing at which the output voltage of the terminal D is turned off. With the series of operations, the locking system is subjected to the transition to the N/L state.

Here, the reason why the output timing of the terminal B is delayed from the output timing of the terminal C by the predetermined period of time T4 is as follows. As in the case of U/L, when the locking system is subjected to the transition to the N/L state, it is assumed that output timings from the microcomputer 2 to the terminal B and the terminal D are set to be equal to each other. In this case, when voltages are actually output, the output timing of the terminal B may be delayed from the output timing of the terminal D because of the individual difference of the required operation times of the U/L relay 12 and the S/L relay 13. In this case, the S/L motor 6 is operated in the S/L direction by the output voltage from the terminal D until the output voltage from the terminal B is applied. This phenomenon is not preferable.

Therefore, according to this embodiment, the output timing of the terminal D is delayed from the output timing of the terminal B by the predetermined period of time T4, and the predetermined period of time T4 is set to be longer than a nominal error (allowable error) between the required operation times of the U/L relay 12 and the S/L relay 13, so that the S/L motor 6 can be reliably prevented from being operated in the S/L direction.

Similarly, of the timings at which the output voltages of the terminal B and the terminal D are turned off, the timing at which the output voltage of the terminal B is turned off is delayed from the timing at which the output voltage of the terminal D is turned off by the predetermined period of time T6. With this arrangement, the difference between the required operation times of the U/L relay 12 and the S/L relay 13 reliably prevents the S/L motor 6 from being operated in the S/L direction.

Figure 4:
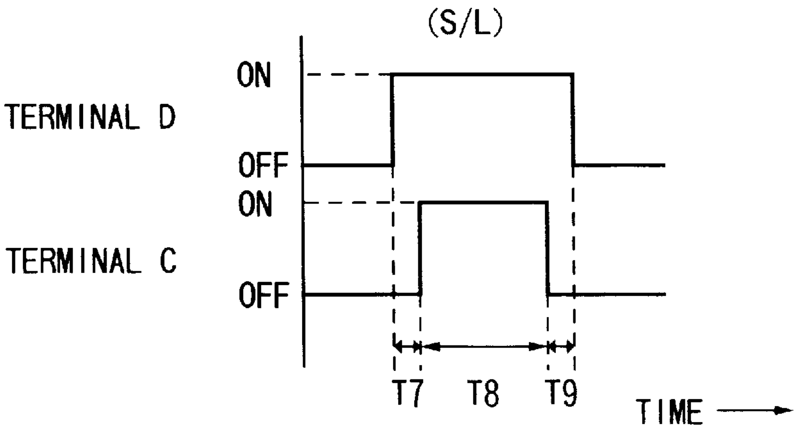
FIG. 4 is a graph showing an output signal for making a transition to an S/L state by the door-lock control device according to the embodiment of the present invention.

FIG. 4 is a graph showing an output signal for causing the door-lock control device according to the embodiment of the present invention to make a transition to the S/L state.

In order to make a transition from the state of the locking system to the S/L state, as shown in FIG. 4, the output voltage of the terminal D is turned on to drive the S/L motor 6 in an S/L direction. The output voltage of the terminal C is turned on a predetermined period of time T7 after the output voltage of the terminal D is turned on to drive the N/L motor 5 in an U/L direction. The output voltage of the terminal C is turned off a predetermined period of time T8 after the output voltage of the terminal C is turned on, and the output voltage of the terminal D is turned off a predetermined period of time T8 after the timing at which the output voltage of the terminal C is turned off.

Here, the reason why the output timing of the terminal D is delayed from the output timing of the terminal C by the predetermined period of time T7 is as follows. As in the cases of U/L and N/L, when the locking system is subjected to the transition to the S/L state, it is assumed that output timings from the microcomputer 2 to the terminal D and the terminal C are set to be equal to each other. In this case, when voltages are actually output, the output timing of the terminal D may be delayed from the output timing of the terminal C because of the individual difference of the required operation times of the N/L relay 11 and the U/L relay 12. In this case, the N/L motor 5 is operated in the U/L direction by the output voltage from the terminal D until the output voltage from the terminal C is applied. This phenomenon is not preferable.

Therefore, according to this embodiment, the output timing of the terminal C is delayed from the output timing of the terminal D by the predetermined period of time T7, and the predetermined period of time T7 is set to be longer than a nominal error (allowable error) between the required operation times of the N/L relay 11 and the U/L relay 12, so that the N/L motor 5 can be reliably prevented from being operated in the U/L direction.

Similarly, of the timings at which the output voltages of the terminal D and the terminal C are turned off, the timing at which the output voltage of the terminal D is turned off is delayed from the timing at which the output voltage of the terminal C is turned off by a predetermined period of time T9. With this arrangement, the difference between the required operation times of the N/L relay 11 and the U/L relay 12 reliably prevents the N/L motor 5 from being operated in the U/L direction.

<Arrangement of Software>

A lock control process performed by the microcomputer 2 will be described below.

Figure 5:
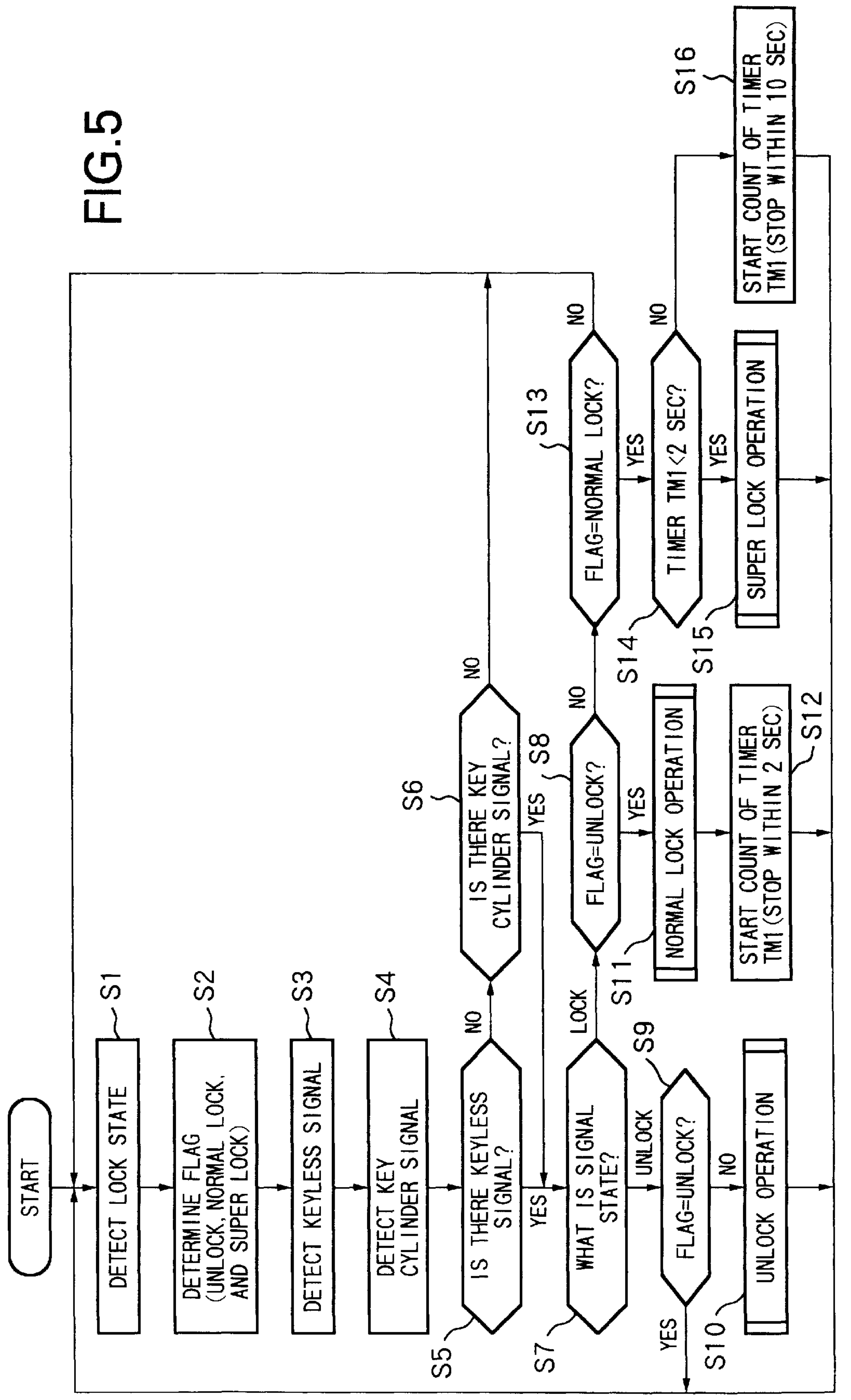
FIG. 5 is a flow chart showing a lock control process of the door-lock control device for vehicle according to the embodiment of the present invention.

FIG. 5 is a flow chart showing a lock control process of a door-lock control device for vehicle according to the embodiment of the present invention.

Step S1: The present state of the lock link switch 15 is detected (step S1).

Step S2: Any one of flags U/L, N/L, and S/L is set in an ON state according to the present state of the lock system.

Step S3: A predetermined keyless signal from an external unit is detected by the keyless entry unit 17.

Step S4: A cylinder signal from the driver's seat key cylinder switch 16A, the passenger seat key cylinder switch 16B, or the lift gate key cylinder switch 16C is detected.

Step S5 to Step S7: It is determined in step S3 whether a keyless signal is detected (step S5). If NO (no keyless signal) in step S3, it is determined in step S4 whether a key cylinder signal is detected (step S6). If NO in step S7 (no key cylinder signal), the flow returns to step S1. If YES in step S5 or step S6 (keyless signal or key cylinder signal is detected), a state represented by the detected signal is determined (step S7). If the signal represents that an unlock state is requested, the flow shifts to step S9; if the signal represents that a lock state is requested, the flow shifts to step S8.

Step S9 and Step S10: It is determined whether the flag set in step S2 is a U/L flag (step S9). If NO in step S9 (unlock state is not set), an unlock operation process (step S10) is performed, and the flow returns to step S1. If YES in step S9 (unlock state is set), the U/L state has been set. For this reason, the flow returns to step S1.

Step S8, Step S11, and Step S12: It is determined whether the flag set in step S2 is a U/L flag (step S8). If NO in step S8 (unlock state is not set), the flow shifts to step S13. If YES in step S8 (unlock state is set), a normal lock operation process (step S11), and a timer TM1 is started to cause the flow to shift to step S1. In this embodiment, when the driver desires the S/L state, a lock request is made again within a predetermined period of time (e.g., 2 seconds). For this reason, the timer TM1 is used to determine whether the second lock request is made. More specifically, in this embodiment, when a lock request is detected again when the count of the timer TM1 is within 2 seconds, it is determined that the S/L state is requested. Therefore, when a transition to the S/L state is made, a normal lock operation is started by the first lock request, and a super lock operation is performed.

Step S13 to Step S16: It is determined whether the flag set in an ON state in step S2 is an N/L flag (step S13). If NO in step S13 (normal lock state is not set), the S/L state has been set. For this reason, the flow directly shifts to step S1. If YES in step S13 (normal lock state is set), it is determined whether the counter of a timer TM2 is 2 seconds or less (step S14). If YES in step S14 (TM2≦2 sec), this condition represents that the S/L state is request. For this reason, a super lock operation process (step S15) is performed, and the flow returns to step S1. On the other hand, if NO in step S14 (TM2>2 †sec), the count of the timer TM1 is started in step S16, and the flow returns to step S1.

The reason why the count of the timer TM1 is started in step S16 will be described below. Even if the operator desires a transition to the S/L state to perform a lock operation twice, when the time interval between the two operations is 2 seconds or longer, NO is determined in step S14, and an S/L operation process cannot be executed. Therefore, when the operator further performs the lock operation, the lock operation is performed to make it possible to make the transition to the S/L state within 2 seconds after the final lock operation.

Figure 6:
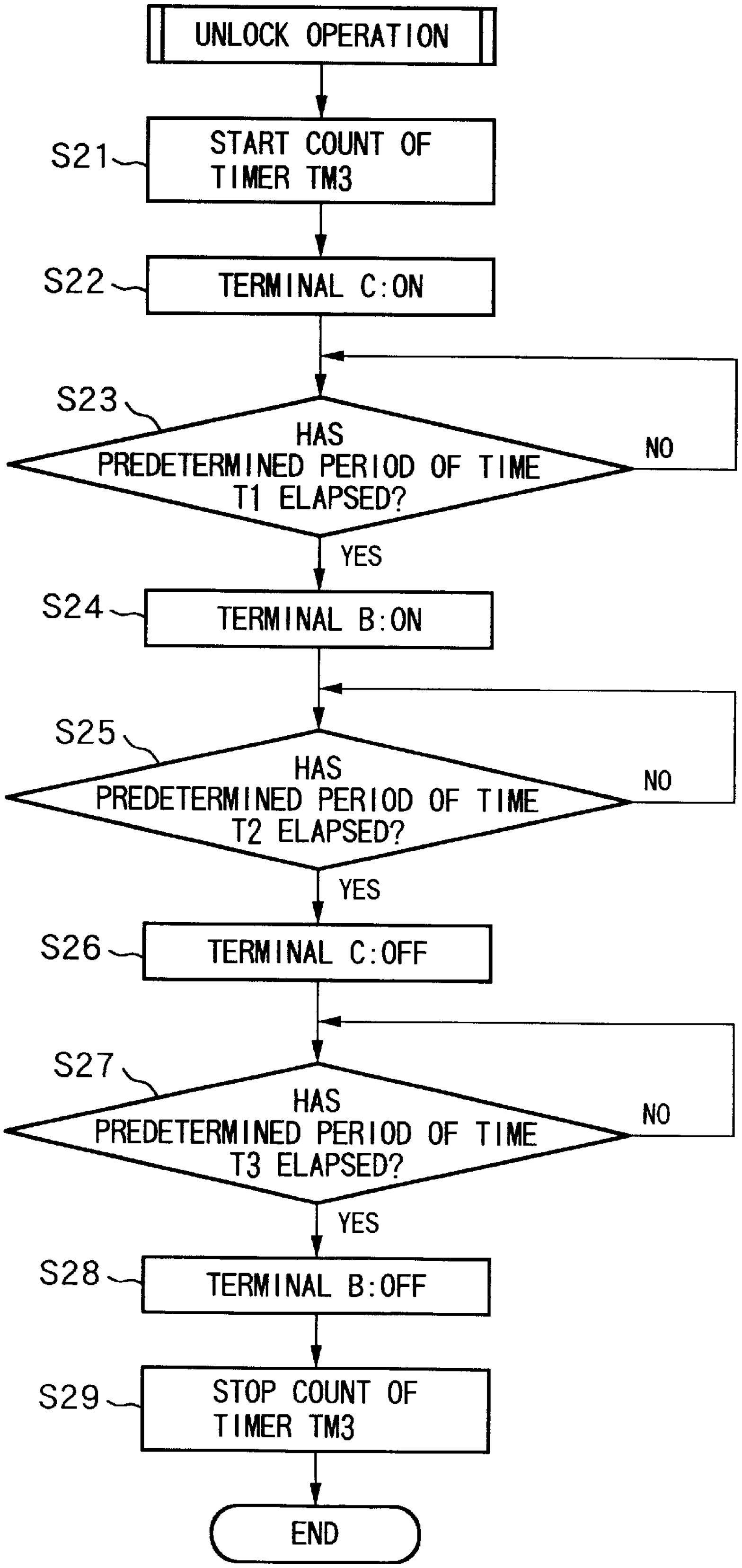
FIG. 6 is a flow chart showing an unlock operation process in the lock control process according to the embodiment of the present invention.

FIG. 6 is a flow chart showing an unlock operation process in the lock control process according to the embodiment of the present invention. This flow chart shows the details of step S10 in FIG. 5 to realize the operation shown in FIG. 2.

Step S21 to Step S24: The count of a timer TM3 is started (step S21), an output voltage from the terminal C is turned on (step S22), and an output voltage from the terminal B is turned on when the count of the timer TM3 is the predetermined period of time T1 (step S23 and step S24).

Step S25 to step S29: When the predetermined period of time T2 has further elapsed in the count of the timer TM3 from the timing of step S23, an output voltage from the terminal C is turned off (step S25 and step S26). When the predetermined period of time T3 has further elapsed, an output voltage from the terminal B is turned off (step S27 and step S28), and the count of the timer TM3 is stopped (step S29).

Figure 7:
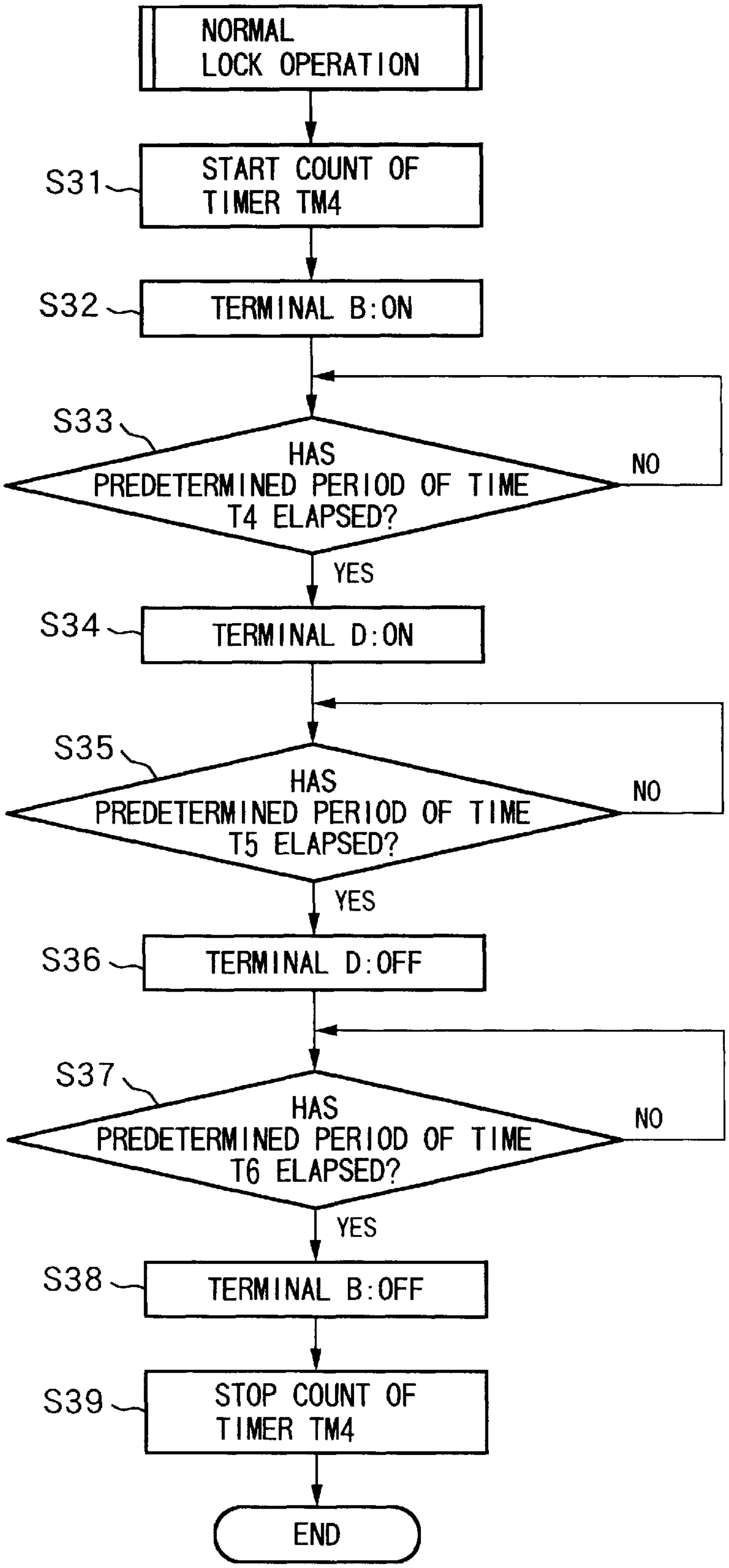
FIG. 7 is a flow chart showing a normal lock operation process in the lock control process according to the embodiment of the present invention.

FIG. 7 is a flow chart showing a normal lock operation process in the lock control process according to the embodiment of the present invention. This flow chart shows the details of step S11 in FIG. 5 to realize the operation shown in FIG. 3.

Step S31 to Step S34: The count of a timer TM4 is started (step S31), an output voltage from the terminal B is turned on (step S32), and an output voltage from the terminal D is turned on when the count of the timer TM4 is the predetermined period of time T4 (step S33 and step S34).

Step S35 to step S39: When the predetermined period of time T5 has further elapsed in the count of the timer TM4 from the timing of step S33, an output voltage from the terminal D is turned off (step S35 and step S36). When the predetermined period of time T6 has further elapsed, an output voltage from the terminal B is turned off (step S37 and step S38), and the count of the timer TM4 is stopped (step S39).

Figure 8:
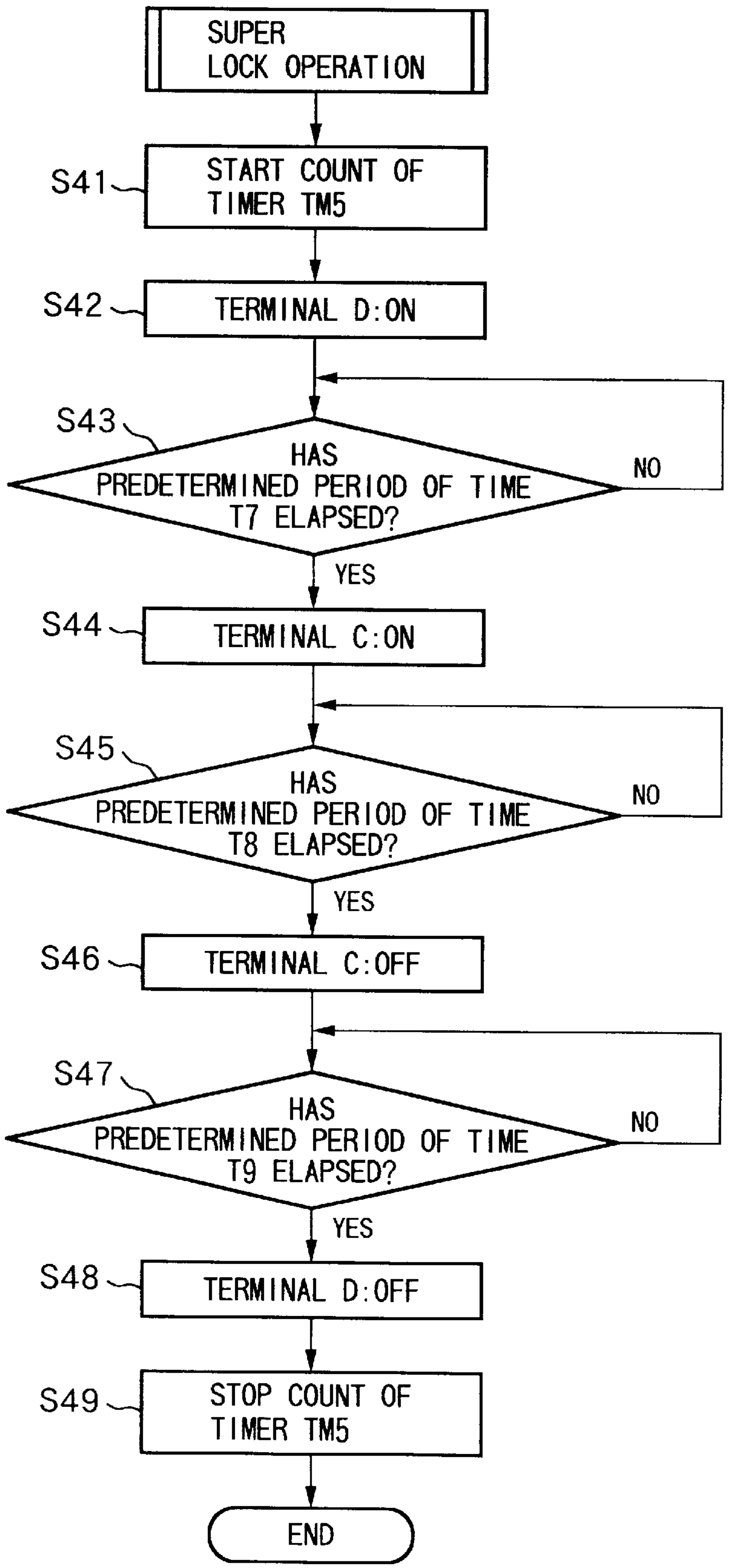
FIG. 8 is a flow chart showing a super lock operation process in the lock control process according to the embodiment of the present invention.

FIG. 8 is a flow chart showing a super lock operation process in the lock control process according to the embodiment of the present invention. This flow chart shows the details of step S15 in FIG. 5 to realize the operation shown in FIG. 4.

Step S41 to Step S44: The count of a timer TM5 is started (step S41), an output voltage from the terminal D is turned on (step S42), and an output voltage from the terminal C is turned on when the count of the timer TM5 is the predetermined period of time T7 (step S43 and step S44).

Step S45 to step S49: When the predetermined period of time T8 has further elapsed in the count of the timer TM5 from the timing of step S43, an output voltage from the terminal C is turned off (step S45 and step S46). When the predetermined period of time T9 has further elapsed, an output voltage from the terminal D is turned off (step S47 and step S48), and the count of the timer TM5 is stopped (step S49).

In this embodiment, the values of the predetermined period of time T1 to the predetermined period of time T9 are set to be T1=0.2, T2=0.4, T3=0.6, T4=0.02, T5=0.4, T6=0.02, T7=0.02, T8=0.4, and T9=0.02, respectively.

As has been described above, according to this embodiment, the supply of a door-lock control device for vehicle which can reliably perform an unlock operation, a lock operation, and a lock-keep operation is realized.

The present invention is not limited to the above embodiments and various changes and modifications can be made within the spirit and scope of the present invention. Therefore, to appraise the public of the scope of the present invention, the following claims are made.

What is claimed is:

1. A door-lock control device for a vehicle for controlling a 2-motor-3-relay type locking mechanism arranged in a vehicle to cause said locking mechanism to perform an unlock operation, a lock operation, and a lock-keep operation, comprising:

a first motor having two terminals which are directly connected to first and second terminals causing said locking mechanism to perform the lock operation in response to current being supplied from the first terminal to the second terminal and causing said locking mechanism to perform the unlock operation in response to current being supplied from the second terminal to the first terminal;

a second motor having two terminals which are directly connected to the first terminal and a third terminal causing said locking mechanism to perform the lock-keep operation in response to current being supplied from the first terminal to the third terminal and causing said locking mechanism to perform the unlock operation in response to current being supplied from the third terminal to the first terminal;

a first relay selectively connecting the first terminal to a ground line or a battery line;

a second relay selectively connecting the second terminal to the ground line or the battery line;

a third relay selectively connecting the third terminal to the ground line or the battery line; and a control device to control said first, second and third relays to perform, via the first, second and third terminals, the lock operation;

wherein said control device controls said locking mechanism by driving said third relay so that the third terminal is connected to the battery line while said first and second relays are not driven so that the first and second terminals are connected to the ground line, and said control device controls said locking mechanism, after said third relay has been driven for a first predetermined period of time so that the third terminal is connected to the battery line, by driving said first relay so that the first terminal is connected to the battery line while said second relay is not being driven and said third relay is being driven.

2. A door-lock control device for a vehicle for controlling a 2-motor-3-relay type locking mechanism arranged in a vehicle to cause said locking mechanism to perform an unlock operation, a lock operation, and a lock-keep-operation, comprising:

a first motor having two terminals which are directly connected to first and second terminals, causing said locking mechanism to perform the lock operation in response to current being supplied from the first terminal to the second terminal and causing said locking mechanism to perform the unlock operation in response to current being supplied from the second terminal to the first terminal;

a second motor having two terminals which are directly connected to the first terminal and a third terminal, causing said locking mechanism to perform the lock-keep operation in response to current being supplied from the first terminal to the third terminal and causing said locking mechanism to perform the unlock operation in response to current being supplied from the third terminal to the first terminal;

a first relay selectively connecting the first terminal to a ground line or a battery line;

a second relay selectively connecting the second terminal to the ground line or the battery line;

a third relay selectively connecting the third terminal to the ground line or the battery line; and a control device to control said first, second and third relays to perform, via the first, second and third terminals, the lock-keep operation:

wherein said control device controls said locking mechanism by driving said first relay so that the first terminal is connected to the battery line while said second and third relays are not driven so that the second and third terminals are connected to the ground line, and said control device controls said locking mechanism, after said first relay has been driven for a first predetermined period of time so that the first terminal is connected to the battery line, by driving said second relay so that the second terminal is connected to the battery line while said first relay is being driven and said third relay is not being driven.

3. A door-lock control device for vehicle according to claim 2, wherein the first predetermined period of time is set to be larger than an allowable error of required operation times of said first and second relays.

4. A door-lock control device for a vehicle for controlling a 2-motor-3-relay type locking mechanism arranged in a vehicle to cause said locking mechanism to perform an unlock operation, a lock operation, and a lock-keep operation, comprising:

a first motor having two terminals which are directly connected to first and second terminals, causing said locking mechanism to perform the lock operation in response to current being supplied from the first terminal to the second terminal and causing said locking mechanism to perform the unlock operation in response to current being supplied from the second terminal to the first terminal;

a second motor having two terminals which are directly connected to the first terminal and a third terminal, causing said locking mechanism to perform the lock-keep operation in response to current being supplied from the first terminal to the third terminal and causing said locking mechanism to perform the unlock operation in response to current being supplied from the third terminal to the first terminal;

a first relay selectively connecting the first terminal to a ground line or a battery line;

a second relay selectively connecting the second terminal to the ground line or the battery line;

a third relay selectively connecting the third terminal to the ground line or the battery line; and a control device to control said first, second and third relays to perform, via the first, second and third terminals, the lock operation;

wherein said control device controls said locking mechanism by driving said first and third relays so that the first and third terminals are connected to the battery line while said second relay is not driven so that the second terminal is connected to the ground line, said control device controls said locking mechanism, after said first and third relays have been driven so that the first and third terminals are connected to the battery line, by stopping driving of said first relay so that the first terminal is connected to the ground line while said second relay is not being driven and said third relay is being driven, and said control device controls said locking mechanism, after stopping driving of said first relay for a first predetermined period of time so that the first terminal is connected to the ground line by stopping driving of said third relay so that the third terminal is connected to the ground line while said first and second relays are not being driven.

5. A door-lock control device for a vehicle for controlling a 2-motor-3-relay type locking mechanism arranged in a vehicle to cause said locking mechanism to perform an unlock operation, a lock operation, and a lock-keep operation, comprising;

a first motor having two terminals which are directly connected to first and second terminals, causing said locking mechanism to perform the lock operation in response to current being supplied from the first terminal to the second terminal and causing said locking mechanism to perform the unlock operation in response to current being supplied from the second terminal to the first terminal;

a second motor having two terminals which are directly connected to the first terminal and a third terminal, causing said locking mechanism to perform the lock-keep operation in response to current being supplied from the first terminal to the third terminal and causing said locking mechanism to perform the unlock operation in response to current being supplied from the third terminal to the first terminal;

a first relay selectively connecting the first terminal to a ground line or a battery line;

a second relay selectively connecting the second terminal to the ground line or the battery line;

a third relay selectively connecting the third terminal to the ground line or the battery line; and a control device to control said first, second and third relays to perform, via the first, second and third terminals, the lock-keep operation;

wherein said control device controls said locking mechanism by driving said first and second relays so that the first and second terminals are connected to the battery line while said third relay is not driven so that the third terminal is connected to the ground line, said control device controls said locking mechanism, after said first and second relays have been driven so that the first and second terminals are connected to the battery line, by stopping driving of said second relay so that the second terminal is connected to the ground line while said first relay is being driven and said third relay is not being driven, and said control device controls said locking mechanism, after said second relay has not been driven for a first predetermined period of time so that the second terminal is connected to the ground line, by stopping driving of said first relay so that the first terminal is connected to the ground line while said second and third relays are not being driven.

6. A door-lock control device for a vehicle according to claim 5, wherein the first predetermined period of time is set to be larger than an allowable error of required operation times of said first and second relays.

7. A door-lock control device for a vehicle according to claim 1, wherein said control device further controls said locking mechanism, after said first relay has been driven so that the first terminal is connected to the battery line, by stopping driving of said first relay so that the first terminal is connected to the ground line while said second relay is not being driven and said third relay is being driven, and said control device controls said locking mechanism, after said first relay has not been driven for a second predetermined period of time so that the first terminal is connected to the ground line, by stopping driving of said third relay so that the third terminal is connected to the ground line while said first and second relays are not being driven.

8. A door-lock control device for a vehicle according to claim 7, wherein the first and second predetermined periods of time are set to be larger than an allowable error of required operation times of said first and third relays.

9. A door-lock control device for a vehicle according to claim 2, wherein said control device further controls said locking mechanism, after said second relay has been driven so that the second terminal is connected to the battery line, by stopping driving of said second relay so that the second terminal is connected to the ground line while said first relay is being driven and said third relay is not being driven, and said control means controls said locking mechanism, after said second relay has not been driven for a second predetermined period of time so that the second terminal is connected to the ground line, by stopping driving of said first relay so that the first terminal is connected to the ground line while said second and third relays are not being driven.

10. A door-lock control device for vehicle according to claim 9, wherein the first and second predetermined periods of time are set to be larger than an allowable error of required operation times of said first and second relays.

11. A door-lock control device for a vehicle according to claim 1, wherein the first predetermined period of time is set to be larger than an allowable error of required operation times of said first and third relays.

12. A door-lock control device for a vehicle according to claim 4, wherein the first predetermined period of time is set to be larger than an allowable error of required operation times of said first and third relays.

* * * * *